Oct. 22, 1946.    S. E. JESSUP    2,409,764
PISTON RING
Filed Nov. 15, 1944    2 Sheets-Sheet 1

INVENTOR.
Sellers E. Jessup,
BY
Attorney.

Oct. 22, 1946. S. E. JESSUP 2,409,764
PISTON RING
Filed Nov. 15, 1944 2 Sheets-Sheet 2
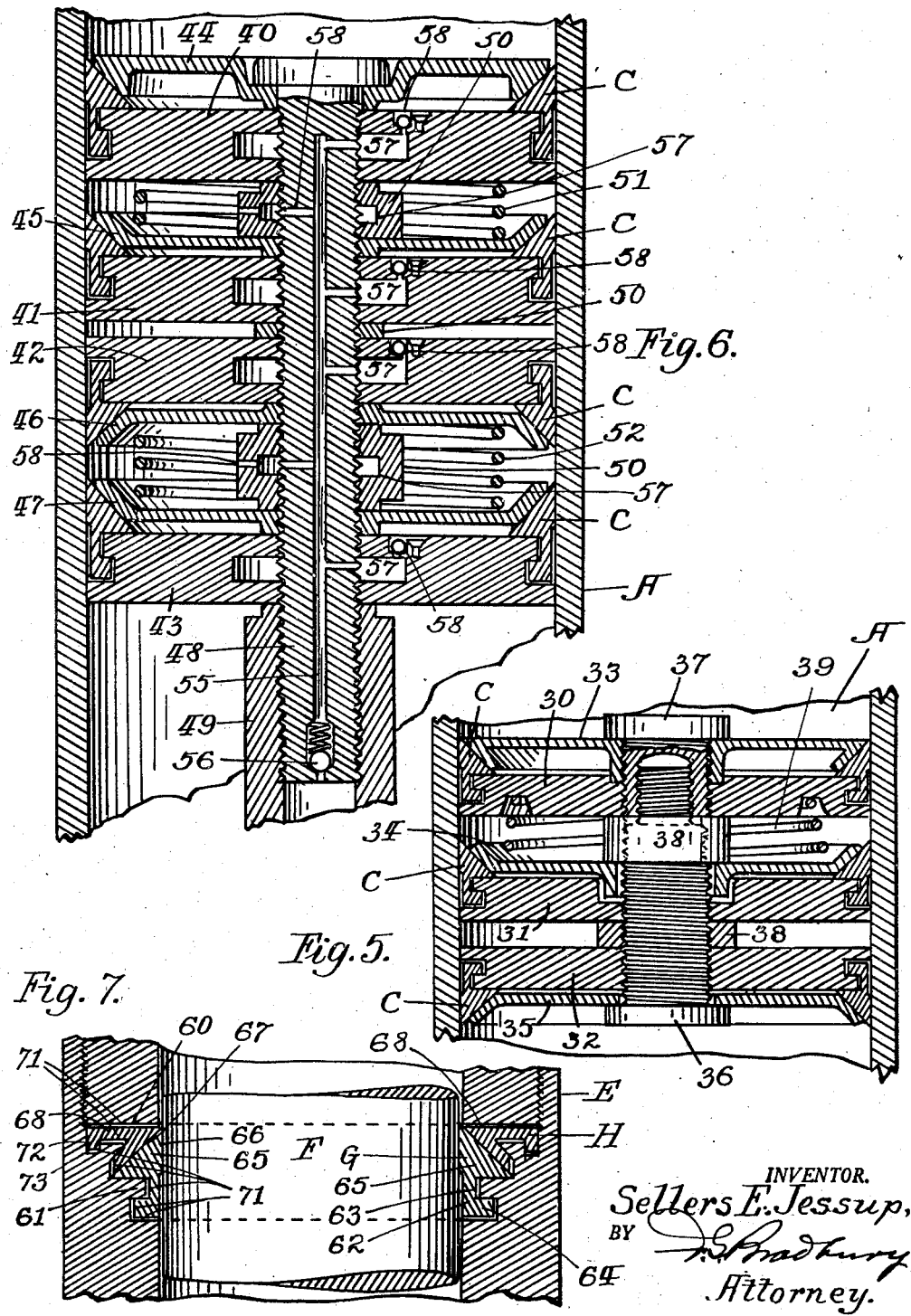
INVENTOR.
Sellers E. Jessup,
BY
Attorney.

Patented Oct. 22, 1946

2,409,764

UNITED STATES PATENT OFFICE 2,409,764

PISTON RING

Sellers E. Jessup, Los Angeles, Calif.

Application November 15, 1944, Serial No. 563,523

8 Claims. (Cl. 809—4)

My invention relates broadly to improved packing means for use between the members of a piston and cylinder couple, and further to a piston ring assembly wherein the expansive force produced by fluid compression within a cylinder is applied to force the piston ring when seated in one member of the couple into fluid tight connection with the working surface of the companion member of the couple, automatically. My improvement further relates to a piston ring assembly which is applied to the end of a piston and which is exposed to the pressure of fluid medium in the cylinder and through the use of an actuator is forced laterally into fluid tight contact between the working surfaces of a piston and cylinder.

My improvement is applicable for use with internal combustion, steam and other types of engines, compressors, pumps, valves, shafts and other devices which employ the equivalent of a piston and cylinder. My improvement further provides improved means which may be assembled into a composite piston structure whereby the invention is applicable for more extended use for various purposes.

The present improvement provides an auxiliary means by which the ring structure is positively applied mechanically as well as by the force of compressed fluid automatically, whereby a more effective leak proof bearing between the piston and cylinder wall is produced. Efficiency in operation is further increased by my improvement both for high or low pressure uses, leakage of compressed fluid and lubricating medium is materially reduced, and the packing ring proper is protected from over heating and detrimental effects of compressed fluid medium and the combustion of fuel. My improvement also provides a metallic packing for gases, liquids or chemicals by which more lasting rubbing surfaces and seals are produced to prevent leaks.

More particularly this application is a continuation in part of my companion applications, Serial No. 472,585, filed January 16, 1943, and Serial No. 539,879, filed June 12, 1944.

Figure 1:
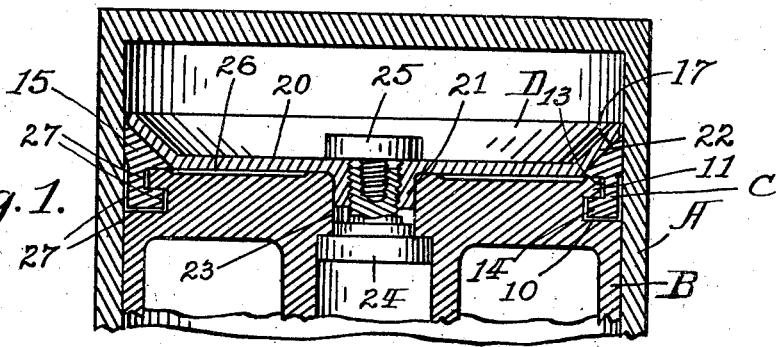
Figure 4:
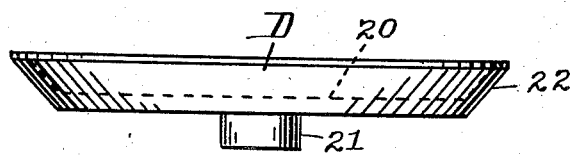
Figure 2:
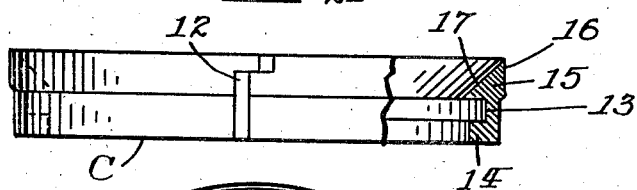
Figure 3:
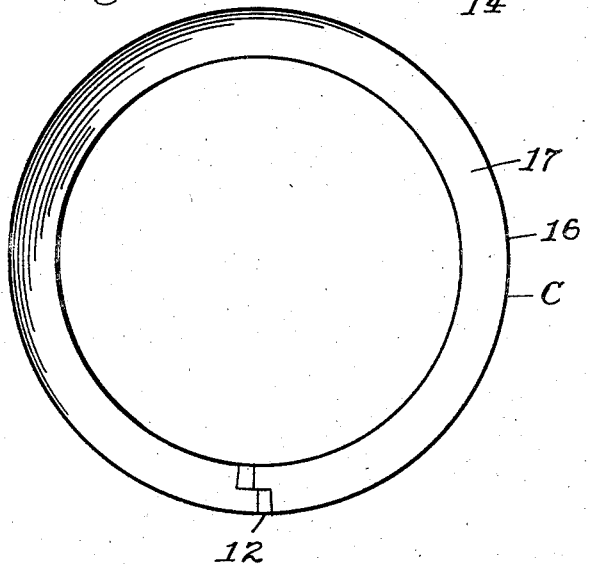

In the accompanying drawings forming part of this specification, Figure 1 is a vertical central section of a detail portion of a cylinder and a companion piston, showing one form of my improved piston ring assembly applied thereto; Fig. 2 is a side elevation of my improved split or overlapping piston ring, a portion thereof being broken away and in section; Fig. 3 is a plan of my improved piston ring which is employed in the structure shown in Fig. 1; Fig. 4 is a side elevation of one form of the flexible piston ring actuator which cooperates with my improved piston ring shown in Fig. 1; Fig. 5 is a vertical central section of a composite piston assembly and a portion of a cylinder having my improved piston ring structure applied thereto; Fig. 6 is a vertical section, showing my improved piston ring assembly applied to another form of composite piston structure, and Fig. 7 is a vertical central section of a detail, showing a modified form of my improved piston ring assembly applied to the cylinder instead of to the piston.

My improved piston ring assembly is shown in one of its simplest forms in Figs. 1 to 4 inclusive, in which A represents a portion of a cylinder and B a portion of a piston, it being understood that my improvement is applicable to various types of piston and cylinder couples which are used in motors, compressors, valves, engines, shafts and other devices. The piston is provided with a peripheral groove or channel 10 in its head end which is open forwardly and radially outwardly and is formed with a radially extending annular lock shoulder 11 at or near its forward end. My improved packing ring of one form resembles an annulus C which is split at 12 to provide a lap joint in the usual manner. This lap joint permits the ring to expand or contract freely. The body of this annulus has an inner channel 13 to receive the lock shoulder 11, and an annular inwardly extending key 14, which freely engages below said lock shoulder to hold the ring on the piston. This means provides an interlocking connection for holding the ring in place on the forward end of the piston. The forward end of this packing ring is provided with a packing head 15 which has an annular broad bearing surface 16 and an inwardly and rearwardly beveled surface 17. Said bearing surface 16 is preferably a ground sliding fit against the inner cylindrical wall of the cylinder and said beveled surface 17 constitutes a guide with which a resilient actuator D cooperates to expand the ring into tight working connection with the inner wall of the cylinder.

The actuator D resembles a comparatively thin disk or deck 20, having an axial hub 21 and a beveled rim 22. The lower beveled surface of the latter corresponds and engages with the beveled surface 17 of the ring so that when the actuator presses downwardly the ring is expanded and its cylindrical surface 16 is pressed radially outwardly into fluid tight working contact with the inner wall of the cylinder. The head end of the piston is provided with a central opening 23 to receive and engage the hub 21 of the actuator and assist in holding the latter concentrically on the piston. A bolt 24 having its shank threadedly connected in the hub serves to fasten the actuator in fixed position on the piston. A supplemental lock bolt 25 having its shank threadedly connected in the shank of bolt 24 and its head impressed against the outer surface of the deck of the actuator serves to assist in holding said fastening means from working loose. When thus secured the actuator holds the split packing ring tightly expanded and adjusted in fluid tight connection with the inner surface of the cylinder wall. The lap joint is also held tightly sealed to prevent leakage by the actuator. The deck of the actuator is sufficiently flexible so that pressure by the expansive force of the compressed fluid exerted against the actuator in the compression chamber of the cylinder bends the body of the actuator and forces its peripheral beveled surface against the corresponding beveled surface of the packing ring and expands the ring automatically into tight working contact with the inner wall of the cylinder to prevent leaking. Thus the greater the force of compressed fluid against the surface of the actuator the tighter the packing ring is held against the inner wall of the cylinder.

Clearance space 26 is provided in the piston below the actuator to permit free expansion under the force of fluid compression. Also free clearance spaces 27 in the ring and in the piston are provided to permit free expansion of the ring and tight seating connection between the ring, cylinder and piston. The seating surfaces between the ring, piston and cylinder and between the beveled seating surfaces of the actuator and ring are preferably a ground fit to produce leak proof and freely working joints.

My improved piston ring assembly is adapted for use in various composite piston structures, Figs. 5 and 6 showing two. It will be understood that various other uses of my invention are contemplated within the spirit thereof. In Fig. 5, the piston structure is composed of three of my improved piston ring assemblies, in which portions of piston bodies such as 30, 31 and 32 are provided with my improved expansion packing rings C, which are secured on the ends thereof by interlocking engagements which are substantially similar to the corresponding interlocking means above described. Flexible actuators, such as 33, 34 and 35, of slightly modified design are tightly secured in the positions shown by bolting, to expand the rings by bolting and by the force of compressed fluid medium exerted against the flexible decks of the actuators, in the manner above described. The three assemblies are secured in composite condition to form a single piston structure by the bolts 36 and 37 and spacer nuts 38, which also function to secure the actuators upon their respective piston bodies. A helical spring 39 is also employed between the piston body 30 and the actuator 34 to augment the expansive force exerted by the latter against the companion packing ring C.

A further modified composite piston structure is illustrated in Fig. 6, in which an assembly of four piston bodies is employed to form a single piston. This structure is somewhat similar to the general type of assembly shown in Fig. 5, except that the four piston body sections 40 to 43 inclusive are held in longitudinally spaced relation and the actuators 44 to 47 inclusive are tied and held in assembled condition by the sectional piston rod. This piston rod is composed of the threadedly engaged tie bolt section 48 and hollow section 49. Suitable spacing nuts 50 are placed between the piston body sections, and helical springs 51 and 52 are employed between the body section 40 and actuator 45 and between the actuators 46 and 47 to augment the expansive force imparted by the actuators 45, 46 and 47 against the packing rings C.

This composite structure has means of lubrication for the contacting surfaces between the packing rings, actuators, piston bodies and cylinder wall. This lubricating means consists of a main longitudinal lubricating feed duct 55 leading through the piston rod section 48 from the hollow piston shaft 49, and thence through suitable chambers 57 in the piston bodies 40 and 43 inclusive and spacing nuts 50, and ducts 58 which enter clearance spaces adjacent to the surfaces to be lubricated. By this means the various parts of the device are supplied with lubricating medium which may be forced through said ducts by any suitable means to keep the parts in efficient functioning condition. A main check valve 56 in the feed duct 55 prevents return movement of the lubricating medium. This lubricating means, it will be noted serves to supply lubricating medium to the cylinder wall in addition to other moving parts in connection with the ring structure.

My invention contemplates that the outside or inside bearing surfaces of a packing ring may be used as a seal proof bearing between the members of a piston and cylinder couple, Fig. 7 illustrating a modification by which my improved piston assembly is seated movably in a cylinder wall and my improved split packing ring is contracted under the force of compressed fluid from within a cylinder by a suitably disposed actuator which is the equivalent of the actuator described in detail above. In this illustration, E is the hollow cylinder and F a piston which is reciprocable therein. The cylinder is provided with an annular channel 60 in its inner wall in which is an inwardly projecting annular lock shoulder 61. My improved split and freely expansible and contractible packing ring G has an annular body 62 formed with an annular lock groove 63 and an annular key 64. The shoulder 61 engages in the lock groove over the key for locking the ring in said channel. The ring also has the annular packing head 65 which is formed with the inner cylindrical bearing surface 66 which has sealing movable contact against the perimeter of the piston. The forward end of the head is formed with the inwardly and rearwardly extending bevel 67. A suitable actuating ring H is retained in the channel 60 freely out of contact with the wall of the piston and is provided with a rearward and diametrally outward bevel which corresponds with and bears against the inward bevel 67. The upper surface 68 of the actuating ring is flat and freely exposed in the adjoining clearance space 71 which is provided by the channel 60 above the actuator. Said clearance space is connected with the usual clearance space 70 between the piston and the inner wall of the cylinder so as to connect the full force of compressed fluid from within the cylinder longitudinally against the actuator and force the actuator longitudinally with its bevel against the bevel of the packing ring and thus contract the latter with its sealing surface held tightly in reciprocable connection with the wall of the piston to produce a leak proof joint. Suitable clearance spaces such as 71, between the split packing ring, actuator and walls of the cylinder permit free functioning of the parts. A shoulder 72 on the actuator and a corresponding circular groove 73 in the wall of the cylinder at the inner portion of the channel 60, provides a freely operating guide for assisting in holding the actuator in freely operable position while the actuator is functioning. The lap joint of the packing ring in this alternative construction is sealed closed by the actuator in a similar manner as in the constructions above described.

Thus, the outside or inside bearing surface of the packing ring can be used to form a leak proof joint between the members of a piston and cylinder couple within the spirit of my invention.

In accordance with the patent statutes, I have described the principles of operation of my improved piston ring structure together with the construction thereof which I now consider to represent the best embodiment thereof, but I desire to have it understood that the construction shown is only illustrative and that the invention can be carried out by other means and applied to uses other than those above set forth without departing from the spirit of the invention and within the scope of the following claims.

I claim:

1. Packing means for use in connection with a reciprocable piston and cylinder couple, which comprises a split ring between the members of said couple having interlocking connection with one of said members, and an actuator cooperating with said ring and normally spaced from the head end of the piston to permit automatic compression under the action of compressed fluid between the members of said couple to produce a fluid tight working connection between said members.

2. A piston ring assembly for use in a cylinder between the members of a piston and cylinder couple, comprising, a packing ring having interlocking means of engagement with one of said members to permit free lateral movement, and an actuator having means of engagement with and normally spaced from one of the members of said couple and engaging said ring to automatically compress the latter into tight connection with the opposing member of said couple by force exerted against the forward side of said actuator.

3. A piston ring assembly for use between the members of a piston and cylinder couple, comprising, a packing ring having movable interlocking means of engagement upon an end of the piston in the cylinder to permit lateral expansion under the force of compressed fluid in the cylinder against the forward end of the piston and said ring, and an expander having means of engagement with and normally spaced from the forward end of the piston and automatically expanding connection with the ring to produce a fluid tight working connection between the ring and the inner wall of the cylinder.

4. A piston ring assembly for use between the members of a piston and cylinder couple, comprising, a split packing ring having freely expandable interlocking means of engagement over an end of the piston, and an expander having means of engagement on and normally spaced from said end of the piston with its rim bearing outwardly against an inner portion of said ring to automatically expand the latter tightly against the inner cylindrical surface of said cylinder.

5. A piston ring assembly for use in a hollow cylinder, comprising, an expansible packing ring having interlocking means of connection on an end of a piston and an inwardly beveled annular forward end, and an expander having means of engagement on and normally spaced from said end of said piston and an outwardly beveled peripheral surface bearing against the beveled surface of the ring to continuously force the latter into tight working connection with the inner wall of the cylinder.

6. A piston ring assembly for use on a piston which is movable in a cylinder, comprising, an expansible packing ring having interlocking connection on an end of the piston and an inwardly beveled annular forward end, and a flexible disk having means of engagement on and spaced from the forward end of the piston and an inwardly beveled annular surface corresponding with the beveled surface of said ring, said disk being flexible and its side exposed to compressed fluid ahead of the piston to force said beveled ends together and tending to continuously expand said ring into tight working connection between said piston and cylinder.

7. A piston ring assembly for use between the inner wall of a cylinder and the outer surface of a cooperating piston, comprising, a series of piston sections secured together to produce a composite piston, each section, comprising, a piston body, an expansible piston ring having interlocking connection on an end of said body and an annular inwardly beveled surface, and a flexible expander having its body mounted upon said end of said piston and provided with a peripheral bevel corresponding with and engaging the beveled surface of said ring to expand the ring into tight working connection with the inner wall of said cylinder by the pressure of fluid in the cylinder.

8. In a structure as defined in claim 7, the sections of said composite structure having a system of lubricating ducts leading to the bearing surfaces between the piston ring and expander elements and cylinder wall.

SELLERS E. JESSUP.